United States Patent
Kim et al.

(10) Patent No.: US 10,870,260 B2
(45) Date of Patent: *Dec. 22, 2020

(54) FILM TOUCH SENSOR AND METHOD FOR FABRICATING THE SAME

(71) Applicant: DONGWOO FINE-CHEM CO., LTD., Jeollabuk-do (KR)

(72) Inventors: Sang Kook Kim, Gyeonggi-do (KR); Seong Hwan Park, Gyeonggi-do (KR); Seung June Park, Gyeonggi-do (KR); Sung Hoon Cho, Gyeonggi-do (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 202 days.

This patent is subject to a terminal disclaimer.

(21) Appl. No.: 16/068,313

(22) PCT Filed: Jan. 6, 2017

(86) PCT No.: PCT/KR2017/000191
§ 371 (c)(1),
(2) Date: Jul. 5, 2018

(87) PCT Pub. No.: WO2017/119761
PCT Pub. Date: Jul. 13, 2017

(65) Prior Publication Data
US 2019/0022977 A1   Jan. 24, 2019

(30) Foreign Application Priority Data
Jan. 8, 2016   (KR) .................. 10-2016-0002569

(51) Int. Cl.
*C08F 232/00* (2006.01)
*C08F 232/08* (2006.01)
(Continued)

(52) U.S. Cl.
CPC ............ *B32B 15/08* (2013.01); *C08F 222/40* (2013.01); *C08F 232/08* (2013.01);
(Continued)

(58) Field of Classification Search
CPC ..... C08F 232/08; C08F 232/00; C08F 232/02
See application file for complete search history.

(56) References Cited

U.S. PATENT DOCUMENTS 9,850,325 B2 * 12/2017 Tsutsumi ................. B01J 31/00
2016/0297181 A1 * 10/2016 Tanabe .................... C08L 45/00
(Continued)

FOREIGN PATENT DOCUMENTS

| CN | 102073428 A | 5/2011 |
| CN | 105204697 A | 12/2015 |

(Continued)

OTHER PUBLICATIONS

International Search Report for PCT/KR20171000191 dated Apr. 27, 2017.
(Continued)

*Primary Examiner* — Rip A Lee
(74) *Attorney, Agent, or Firm* — The PL Law Group, PLLC

(57) ABSTRACT

A film touch sensor includes a separation layer, a protective layer which is disposed on the separation layer and is a cured layer of a polymer having a repeating unit represented by Formula 1 or 2, and an electrode pattern layer disposed on the protective layer, such that it is possible to suppress thermal damage such as wrinkles, or cracks of an protective layer, which may occur in high-temperature deposition and annealing processes, and significantly reduce an occurrence rate of cracks during peeling-off the same from a carrier substrate.

9 Claims, 3 Drawing Sheets

(51) Int. Cl.
  *B32B 15/08* (2006.01)
  *G06F 3/041* (2006.01)
  *C09D 145/00* (2006.01)
  *C08F 222/40* (2006.01)
  *B32B 15/20* (2006.01)
  *B32B 27/30* (2006.01)

(52) U.S. Cl.
  CPC .......... *C09D 145/00* (2013.01); *G06F 3/041* (2013.01); *B32B 15/20* (2013.01); *B32B 27/30* (2013.01); *B32B 2307/732* (2013.01); *G06F 2203/04102* (2013.01); *G06F 2203/04103* (2013.01); *G06F 2203/04111* (2013.01)

(56) References Cited

U.S. PATENT DOCUMENTS

| | | | | |
|---|---|---|---|---|
| 2017/0186874 | A1* | 6/2017 | Goto | ............... H01L 29/66969 |
| 2018/0022912 | A1* | 1/2018 | Tsutsumi | ............. C08L 101/00 430/270.1 |
| 2019/0022977 | A1* | 1/2019 | Kim | ..................... G06F 3/041 |
| 2019/0022978 | A1* | 1/2019 | Kim | ..................... C08F 232/08 |

FOREIGN PATENT DOCUMENTS

| | | | | |
|---|---|---|---|---|
| CN | 108604137 A | 9/2018 | | |
| KR | 10-1191865 B1 | 10/2012 | | |
| KR | 10-1201387 B1 | 11/2012 | | |
| KR | 10-2013-0010868 A | 1/2013 | | |
| KR | 10-2015-0014857 A | 2/2015 | | |
| KR | 10-2015-0020363 A | 2/2015 | | |
| TW | 200746179 A | 12/2007 | | |
| TW | 201510818 A | 3/2015 | | |
| TW | 201532821 A | 9/2015 | | |
| WO | 2013022263 A2 | 2/2013 | | |
| WO | WO 2013/137398 A1 * | 9/2013 | ............. | C08G 61/08 |
| WO | 2015023063 A1 | 2/2015 | | |
| WO | WO 2015/076063 A1 | 5/2015 | | |
| WO | WO 2015/080071 A1 * | 6/2015 | ........... | H01L 21/336 |
| WO | WO 2015/080073 A1 * | 6/2015 | ............. | B32B 27/00 |

OTHER PUBLICATIONS

Office action dated Aug. 28, 2020 from China Patent Office in a counterpart China Patent Application No. 201780006123.8 (English translation is also submitted herewith.).

* cited by examiner (a)

(b)

(c)

FILM TOUCH SENSOR AND METHOD FOR FABRICATING THE SAME

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2017/000191, filed Jan. 6, 2017, which claims priority to the benefit of Korean Patent Application No. 10-2016-0002569 filed in the Korean Intellectual Property Office on Jan. 8, 2016, the entire contents of which are incorporated herein by reference.

BACKGROUND OF THE INVENTION

1. Field of the Invention

The present invention relates to a film touch sensor and a method for fabricating the same.

2. Description of the Related Art

Attempts are being made to introduce a touch input type into a wider variety of electronic devices due to the touch input type being in the spotlight as a next-generation input type. Accordingly, research and development for a touch sensor capable of being applied to different environments and accurately recognizing a touch have been actively executed.

For example, in a case of the electronic device having a touch input type display, an ultrathin flexible display which achieves an ultralight and a low power consumption with improved portability is in the spotlight as a next-generation display, and thus the development for a touch sensor applicable to such a display is required.

The flexible display refers to a display fabricated on a flexible substrate which is capable of being bent, folded, or warped having no reduction in operational characteristics, and techniques thereof have been developed in a form such as flexible LCDs, flexible OLEDs, electronic papers, and the like.

In order to apply the touch input type to such the flexible display, a touch sensor having excellent bendability and restoring force, as well as superior flexibility and elasticity is required.

In regard to a film touch sensor for fabricating such the flexible display, a wiring substrate including wirings buried in a transparent resin base film has been proposed.

A method for fabricating a film touch sensor includes: a wiring formation process of forming metal wirings on a carrier substrate, a lamination process of applying a transparent resin solution to carrier substrate and drying so as to cover the metal wirings, and a peeling-off process of peeling-off the transparent resin solution from the carrier substrate.

In order to smoothly perform the peeling-off process, the above-described fabrication method uses a method in which an organic peeling-off agent such as a silicone resin or a fluorine resin; or an inorganic peeling-off agent such as a diamond-like carbon (DLC) thin film or a zirconium oxide thin film is formed on a surface of the substrate in advance. However, in a case of using the inorganic peeling-off agent in the above method, when peeling-off the base film and the metal wirings from the carrier substrate, the base film and the metal wirings are not smoothly peeled-off therefrom, such that a portion of the base film or the metal wirings is remained on the carrier substrate, and an organic material used as the peeling-off agent comes out on the surface of the base film and metal wirings.

In order to solve the above-described problems, Korean Patent Registration Publication No. 1191865 discloses a method in which, in a step of fabricating a flexible substrate of a form having metal wirings buried therein, a sacrificial layer capable of being removed by light or a solvent, metal wirings and a polymer material (flexible substrate) are formed on a carrier substrate, and the sacrificial layer is removed by using the light or solvent, and thereby the metal wirings and the polymer material (flexible substrate) are removed from the carrier substrate.

However, the above-described method has problems that, in a case of having a large size, it is difficult to remove the sacrificial layer in the removing process thereof, the metal wirings are directly exposed to a liquid such as the solvent, and various types of base film may not be used because performing a high-temperature process is impossible.

Also, there is a problem that a protective layer, an insulation layer, or the like is damaged due to a stress applied to the film touch sensor during peeling-off.

SUMMARY

Technical Problem

Accordingly, it is an object of the present invention to provide a film touch sensor including a protective layer for covering an electrode pattern layer.

Another object of the present invention is to provide a film touch sensor capable of significantly reducing an occurrence rate of cracks during peeling-off the same from a carrier substrate.

In addition, another object of the present invention is to provide a film touch sensor capable of suppressing thermal damage such as wrinkles, or cracks of an insulation layer, which may occur in high-temperature deposition and annealing processes, due to including an insulation layer having excellent thermal resistance.

Further, another object of the present invention is to provide a method for fabricating the above film touch sensor.

Technical Solution

The above objects of the present invention will be achieved by the following characteristics:

(1) A film touch sensor including: a separation layer; a protective layer which is disposed on the separation layer and is a cured layer of a polymer having a repeating unit represented by Formula 1 or 2 below; and an electrode pattern layer disposed on the protective layer:

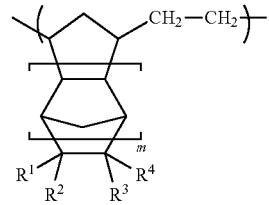

[Formula 1]

(wherein at least one of $R^1$ to $R^4$ is $-X_n-Y_1$, n is 0 or 1, X is an alkylene group or a carbonyl group having 1 to 6 carbon atoms, $Y_1$ is a protonic polar group, the others of $R^1$ to $R^4$ is hydrogen or $-X_n-Y_2$, $Y_2$ is an alkyl group having 1 to 6 carbon atoms, an aryl group having 6 to 12 carbon atoms, or a protonic polar group, wherein the $Y_2$ may be substituted with an alkyl group having 1 to 4 carbon atoms or an aryl group having 6 to 12 carbon atoms, and m is an integer of 0 to 2).

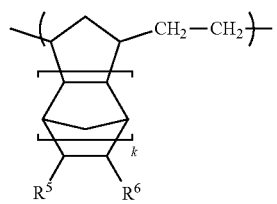

[Formula 2]

(wherein $R^5$ and $R^6$ are connected with each other to form a 3-membered or 5-membered hetero ring which may be substituted with an alkyl group having 1 to 4 carbon atoms or an aryl group having 6 to 12 carbon atoms, and k is an integer of 0 to 2).

(2) The film touch sensor according to the above (1), wherein the polymer has a glass transition temperature of 100° C. or higher.

(3) The film touch sensor according to the above (1), wherein the protective layer has an elastic modulus of 2.8 to 4.5 GPa.

(4) The film touch sensor according to the above (1), wherein the protective layer has a transmittance of 90% or more.

(5) The film touch sensor according to the above (1), further including a base film attached to an upper side of the electrode pattern layer.

(6) An image display device including the film touch sensor according to the above (1).

(7) A method for fabricating a film touch sensor including the steps of: forming a separation layer on a carrier substrate; applying a protective layer forming composition which contains a polymer having a repeating unit represented by Formula 1 or 2 below on the separation layer and curing the same to form a protective layer thereon; forming an electrode pattern layer on the protective layer; and peeling-off the separation layer from the carrier substrate:

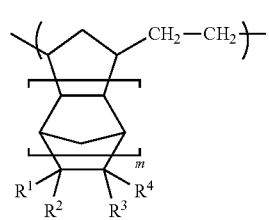

[Formula 1]

(wherein at least one of $R^1$ to $R^4$ is $—X_n—Y_1$, n is 0 or 1, X is an alkylene group or a carbonyl group having 1 to 6 carbon atoms, $Y_1$ is a protonic polar group, the others of $R^1$ to $R^4$ is hydrogen or $—X_n—Y_2$, $Y_2$ is an alkyl group having 1 to 6 carbon atoms, an aryl group having 6 to 12 carbon atoms, or a protonic polar group, wherein the $Y_2$ may be substituted with an alkyl group having 1 to 4 carbon atoms or an aryl group having 6 to 12 carbon atoms, and m is an integer of 0 to 2).

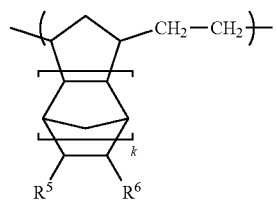

[Formula 2]

(wherein $R^5$ and $R^6$ are connected with each other to form a 3-membered or 5-membered hetero ring which may be substituted with an alkyl group having 1 to 4 carbon atoms or an aryl group having 6 to 12 carbon atoms, and k is an integer of 0 to 2).

(8) The method for fabricating a film touch sensor according to the above (7), wherein the curing of the protective layer forming composition is performed including pre-bake and post-bake.

(9) The method for fabricating a film touch sensor according to the above (8), wherein the post-bake is performed at 180° C. to 250° C. for 20 minutes to 50 minutes.

Advantageous Effects

The film touch sensor of the present invention has excellent thermal resistance, such that it is possible to suppress thermal damage such as wrinkles, cracks, or the like which may occur in the high-temperature deposition and annealing processes. Thereby, it is possible to achieve an electrode pattern layer having a lower resistance due to performing the high-temperature deposition and annealing processes.

The film touch sensor of the present invention may significantly reduce an occurrence rate of cracks during peeling-off the same from a carrier substrate.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

The present invention discloses a film touch sensor including: a separation layer; a protective layer which is disposed on the separation layer and is a cured layer of a polymer having a repeating unit represented by Formula 1 or 2; and an electrode pattern layer disposed on the protective layer, such that it is possible to suppress thermal damage such as wrinkles, or cracks of an insulation layer, which may occur in high-temperature deposition and annealing processes, and significantly reduce an occurrence rate of cracks during peeling-off the same from a carrier substrate, and a method for fabricating the same.

Hereinafter, the present invention will be described in detail.

The film touch sensor of the present invention includes a separation layer, a protective layer and an electrode pattern layer.

In particular, embodiments of the present invention will be described in detail with reference to accompanying drawings.

Figure 1:
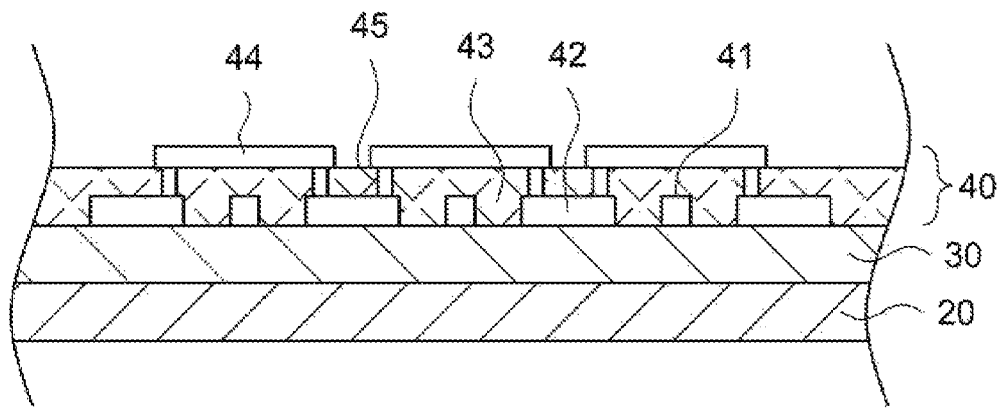
FIG. 1 is a schematic cross-sectional view illustrating a film touch sensor according to one embodiment of the present invention.
Figure 2:
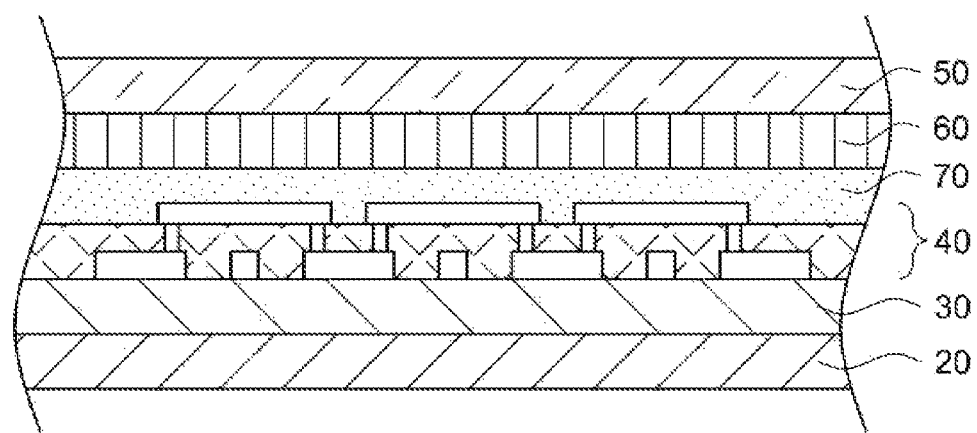
FIG. 2 is a schematic cross-sectional view illustrating the film touch sensor according to another embodiment of the present invention.

FIGS. 1 and 2 are schematic cross-sectional views illustrating the film touch sensor according to the embodiments of the present invention.

The film touch sensor of the present invention is fabricated by executing a fabrication process on a carrier substrate 10 to prepare a laminate, and separating the prepared laminate from the carrier substrate 10. A separation layer 20 is a layer formed to separate the laminate from the carrier substrate 10.

The separation layer 20 serves as a layer for covering an electrode pattern layer 40 to protect the electrode pattern layer 40 after separating from the carrier substrate 10 without being removed therefrom.

The separation layer 20 may be a polymer organic film, and may be made of, for example, a polymer such as polyimide polymer, polyvinyl alcohol polymer, polyamic acid polymer, polyamide polymer, polyethylene polymer, polystyrene polymer, polynorbornene polymer, phenyl maleimide copolymer, polyazobenzene polymer, polyphenylene phthalamide polymer, polyester polymer, polymethyl methacrylate polymer, polyarylate polymer, cinnamate polymer, coumarin polymer, phthalimidine polymer, chalcone polymer, aromatic acetylene polymer, but it is not limited thereto. These compounds may be used alone or in combination of two or more thereof.

It is preferable that the separation layer 20 is made of a material having a peel-off strength of 1 N/25 mm or less with respect to the carrier substrate 10 among the above-described materials, so as to be easily peeled-off from the carrier substrate 10, but not to be peeled-off from a protective layer 30 to be described below.

The separation layer 20 preferably has a thickness of 10 to 1000 nm, and more preferably, 50 to 500 nm. If the thickness of the separation layer 20 is less than 10 nm, uniformity of the separation layer 20 during applying is deteriorated, thereby electrode patterns are unevenly formed, tearing occurs therein due to a locally increased peel-off strength, or curling of the film touch sensor may be not controlled after separating from the carrier substrate 10. If the thickness thereof exceeds 1000 nm, the peel-off strength is not further decreased, and flexibility of the film is deteriorated.

The protective layer 30 is disposed on the separation layer 20, and, similar to the separation layer 20, covers the electrode pattern layer 40 to prevent the electrode pattern layer 40 from being polluted, and the electrode pattern layer 40 from being broken during separating from the carrier substrate 10.

The protective layer 30 according to the present invention is a cured layer of a polymer having a repeating unit represented by Formula 1 or 2 below:

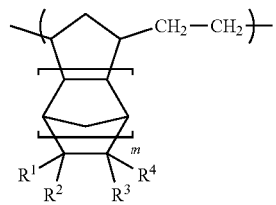

[Formula 1]

(wherein at least one of $R^1$ to $R^4$ is $-X_n-Y_1$, n is 0 or 1, X is an alkylene group or a carbonyl group having 1 to 6 carbon atoms, $Y_1$ is a protonic polar group, the others of $R^1$ to $R^4$ is hydrogen or $-Xn-Y_2$, $Y_2$ is an alkyl group having 1 to 6 carbon atoms, an aryl group having 6 to 12 carbon atoms, or a protonic polar group, wherein the $Y_2$ may be substituted with an alkyl group having 1 to 4 carbon atoms or an aryl group having 6 to 12 carbon atoms, and m is an integer of 0 to 2).

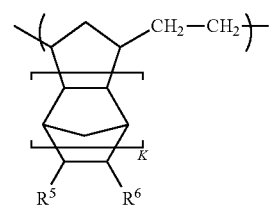

[Formula 2]

(wherein $R^5$ and $R^6$ are connected with each other to form a 3-membered or 5-membered hetero ring which may be substituted with an alkyl group having 1 to 4 carbon atoms or an aryl group having 6 to 12 carbon atoms, and k is an integer of 0 to 2).

In the present disclosure, the heterocyclic ring is referred to a ring having one or more heteroatoms (N, O, P, S, etc.) in the ring.

In Formula 2, examples of the 3-membered heterocyclic structure which can be formed by $R^5$ and $R^6$ may include an epoxy structure, or the like. In addition, examples of the 5-membered heterocyclic structure of $R^5$ and $R^6$ may include a dicarboxylic anhydride structure [—C(O)—O—C(O)—], a dicarboxy imide structure [—C(O)—N—C(O)—].

Polymers having the repeating unit represented by Formula 1 or 2 according to the present invention have a high glass transition temperature. For example, the glass transition temperature may be 100° C. or higher, preferably 150° C. or higher, more preferably 200° C. or higher, and most preferably 250° C. or higher. By having such a high glass transition temperature as described above, the protective layer 30 including the polymer may have high heat resistance, thus to suppresses heat damage such as wrinkles, cracks, and color change which may occur in the high temperature deposition and annealing processes during forming the sensing electrode such as ITO, or the like.

In addition, the polymer has excellent solvent resistance to various solvents such as an etchant and a developing solution which may be exposed during forming the sensing electrode.

The protective layer 30 according to the present invention is the cured layer of a polymer having the repeating unit represented by Formula 1 or 2, and may have excellent elasticity, thus to reduce an occurrence rate of cracks that may occur during peeling-off the film touch sensor from the carrier substrate.

The elastic protective layer 30 may have an elastic modulus of, for example, 2.8 to 4.5 GPa. If the elastic modulus thereof is less than 2.8 GPa, wrinkles may occur in the insulation layer 43 during forming the electrode. If the elastic modulus thereof exceeds 4.5 GPa, cracks may occur during peeling-off from the carrier substrate. The elastic modulus within the above range may be obtained, for example, by setting the post-bake temperature to 180° C. or higher. In an aspect of satisfying an excellent level of wrinkle suppression and peeling inhibition effects, the elastic modulus thereof is preferably 3 to 4.2 GPa.

In addition, the protective layer 30 according to the present invention has a very high transmittance. For example, the transmittance thereof may be 90% or more, preferably 95% or more, and more preferably, 97% or more. The transmittance within the above range may be obtained, for example, by setting the post-bake temperature to 180° C. to 250° C.

The polymer having a repeating unit represented by Formula 1 or 2 according to the present invention is a cyclic olefin polymer containing a protonic polar group.

In the present disclosure, the term "protonic polar group" is referred to an atomic group in which a hydrogen atom is directly bonded to atoms other than a carbon atom. Herein, the atoms other than the carbon atom are preferably atoms belonging to groups 15 and 16 of the periodic table, more preferably, atoms belonging to the first and second periods of groups 15 and 16 of the periodic table, furthermore preferably, oxygen, nitrogen and sulfur atoms, and particularly preferably, the oxygen atom.

Specific examples of the protonic polar group may include a polar group having an oxygen atom such as a carboxyl group (hydroxycarbonyl group), sulfonic acid group, phosphoric acid group, hydroxyl group, etc.; a polar group having a nitrogen atom such as a primary amino group, secondary amino group, primary amide group, secondary amide group (imide group), etc.; and a polar group having a sulfur atom such as a thiol group, etc. Among them, the polar group preferably has the oxygen atom, and more preferably, the carboxyl group.

The cyclic olefin polymer used in the present invention is a homopolymer or a copolymer of a cyclic olefin monomer having a cyclic structure (alicyclic or aromatic ring) of a cyclic olefin monomer unit in a main chain thereof. The term "cyclic olefin" in the present disclosure is referred to an olefin monomer having a cyclic structure containing a ring-opening polymerizable carbon-carbon double bond.

The cyclic olefin polymer may have a monomer unit other than the cyclic olefin monomer. The proportion of the cyclic olefin monomer unit in an entire structural unit of such a cyclic olefin polymer is commonly 30 to 100 wt. % ('wt. %'), preferably 50 to 100 wt. %, and more preferably, 70 to 100 wt. %.

In the cyclic olefin polymer containing a protonic polar group according to the present invention, a ratio of the monomer unit having a protonic polar group to the other monomer units (monomer unit having a protonic polar group/other monomer units) is commonly 100/0 to 10/90, preferably 90/10 to 20/80, and more preferably, 80/20 to 30/70.

As a method of preparing the cyclic olefin polymer containing a protonic polar group used in the present invention, there may be a method of polymerizing a cyclic olefin monomer having a protonic polar group, and then performing hydrogenation as desired.

Specific examples of the cyclic olefin monomer having a protonic polar group may include, cyclic olefin having a carboxyl group such as 5-hydroxycarbonyl bicyclo[2.2.1]hepto-2-ene, 5-methyl-5-hydroxycarbonyl bicyclo[2.2.1]hepto-2-ene, 5-carboxymethyl-5-hydroxycarbonyl bicyclo[2.2.1]hepto-2-ene, 5-exo-6-endo-dihydroxycarbonyl bicyclo[2.2.1]hepto-2-ene, 8-hydroxycarbonyl tetracyclo[4.4.0.1$^{2,5}$.1$^{7,10}$]dodeca-3-ene, 8-methyl-8-hydroxycarbonyl tetracyclo[4.4.0.1$^{2,5}$.1$^{7,10}$]dodeca-3-ene, 8-exo-9-endo-dihydroxycarbonyl tetracyclo[4.4.0.1$^{2,5}$.1$^{7,10}$]dodeca-3-ene, etc.; cyclic olefin having a hydroxy group such as 5-(4-hydroxyphenyl) bicyclo[2.2.1]hepto-2-ene, 5-methyl-5-(4-hydroxyphenyl) bicyclo[2.2.1]hepto-2-ene, 8-(4-hydroxyphenyl) tetracyclo[4.4.0.1$^{2,5}$.1$^{7,10}$]dodeca-3-ene, 8-methyl-8-4-hydroxyphenyl) tetracyclo[4.4.0.1$^{2,5}$.1$^{7,10}$]dodeca-3-ene, etc. Among them, the cyclic olefin having a hydroxy group is preferably used.

The hydrogenation is commonly carried out using a hydrogenation catalyst. As the hydrogenation catalyst, for example, catalysts generally used for hydrogenation of an olefin compound may be used. Specifically, a homogeneous Ziegler type catalyst, a noble metal complex catalyst, a supported noble metal catalyst, or the like may be used. Among these hydrogenation catalysts, the noble metal complex catalysts such as rhodium, ruthenium, etc. are preferably used in an aspect that they can be selectively hydrogenated to a carbon-carbon unsaturated bond in the polymer without causing a side reaction such as modification of functional groups such as a protonic polar group, and more preferably, a ruthenium catalyst in which nitrogen-containing heterocyclic carbene compounds having high electron-donating ability or phosphines are coordinated. Meanwhile, the hydrogenation rate of the cyclic olefin polymer is preferably 80% or more, and more preferably, 90% or more.

In addition, the cyclic olefin polymer containing a protonic polar group according to the present invention may also be obtained by introducing a protonic polar group into a protonic cyclic olefin having no polar group polymer by a known method using a modifying agent. In this case, hydrogenation may be performed to the polymer before and after the introduction of the protonic polar group.

The protonic cyclic olefin having no polar group polymer may be obtained by further polymerizing the cyclic olefin monomer having no polar group, and if necessary, a monomer other than the cyclic olefin monomer according to a conventional method. Examples of the protonic cyclic olefin monomer having no polar group may include a cyclic olefin monomer having no polar group and a non-cyclic olefin monomer having a protonic polar group. Monomers other than cyclic olefin monomers may include a vinyl alicyclic hydrocarbon monomer, vinyl aromatic hydrocarbon monomer, chain olefin, or the like.

Specific examples of the cyclic olefin having no polar group may include bicyclo[2.2.1]hepto-2-ene (common name: norbornene), 5-ethyl-bicyclo[2.2.1]hepto-2-ene, 5-butyl-bicyclo[2.2.1]hepto-2-ene, 5-ethylidene-bicyclo[2.2.1]hepto-2-ene, 5-methylidene-bicyclo[2.2.1]hepto-2-ene, 5-vinyl-bicyclo[2.2.1]hepto-2-ene, tricyclo[4.3.0.1$^{2,5}$] deca-3,7-diene (common name: dicyclopentadiene), tetracyclo[8.4.0.1$^{11,14}$.0$^{3,7}$]pentadeca-3,5,7,12,11-pentaene, tetracyclo[4.4.0.1$^{2,5}$.1$^{7,10}$]deca-3-ene (common name: tetracyclododecene), 8-methyl-tetracyclo[4.4.0.1$^{2,5}$.1$^{7,10}$]dodeca-3-ene, 8-ethyl-tetracyclo[4.4.0.1$^{2,5}$.1$^{7,10}$]dodeca-3-ene, 8-methylidene-tetracyclo[4.4.0.1$^{2,5}$.1$^{7,10}$]dodeca-3-ene, 8-ethylidene-tetracyclo[4.4.0.1$^{2,5}$.1$^{7,10}$]dodeca-3-ene, 8-vinyl-tetracyclo[4.4.0.1$^{2,5}$.1$^{7,10}$]dodeca-3-ene, 8-propenyl-tetracyclo[4.4.0.1$^{2,5}$.1$^{7,10}$]dodeca-3-ene, pentacyclo[6.5.1.1$^{3,6}$.0$^{2,7}$.0$^{9,13}$]pentadeca-3,10-diene, cyclopentene, cyclopentadiene, 1,4-methano-1,4,4a,5,10,10a-hexahydroanthracene, 8-phenyl-tetracyclo[4.4.0.1$^{2,5}$.1$^{7,10}$]dodeca-3-ene, tetracyclo[9.2.1.0$^{2,10}$.0$^{3,8}$]tetradeca-3,5,7,12-tetraene (referred to as "1,4-methano-1,4,4a,9a-tetrahydro-9H-fluorene"), pentacyclo[7.4.0.1$^{3,6}$.1$^{10,13}$.0$^{2,7}$]pentadeca-4,11-diene, pentacyclo[9.2.1.1$^{4,7}$.0$^{2,10}$.0$^{3,8}$]pentadeca-5,12-diene, or the like. These cyclic olefin monomers may be used alone or in combination of two or more thereof.

Specific examples of an aprotic polar group may include an ester group (generically referred to as an alkoxy carbonyl group and aryloxy carbonyl group), N-substituted imide group, epoxy group, cyano group, carbonyl-oxy-carbonyl group (an acid anhydride residue of a dicarboxylic acid), alkoxy group, carbonyl group, tertiary amino group, sulfone group, halogen atom, and acryloyl group. Among them, the ester group, N-substituted imide group, cyano group and halogen atom are preferably used, and the ester group and N-substituted imide group are more preferably used. In particular, the N-substituted imide group is preferably used.

As the non-cyclic olefin monomer having a protonic polar group, the following compounds are specifically exemplified.

The cyclic olefin having an ester group may include, for example, 5-acetoxy bicyclo[2.2.1]hepto-2-ene, 5-methoxycarbonyl bicyclo[2.2.1]hepto-2-ene, 5-methyl-5-methoxycarbonyl bicyclo[2.2.1]hepto-2-ene, 8-acetoxy tetracyclo[4.4.0.1$^{2,5}$.1$^{7,10}$]dodeca-3-ene, 8-methoxycarbonyl tetracyclo[4.4.0.1$^{2,5}$.1$^{7,10}$]dodeca-3-ene, 8-ethoxycarbonyl tetracyclo[4.4.0.1$^{2,5}$.1$^{7,10}$]dodeca-3-ene, 8-n-propoxycarbonyl tetracyclo[4.4.0.1$^{2,5}$.1$^{7,10}$]dodeca-3-ene, 8-isopropoxycarbonyl tetracyclo[4.4.0.1$^{2,5}$.1$^{7,10}$]dodeca-3-ene, 8-n-butoxycarbonyl tetracyclo[4.4.0.1$^{2,5}$.1$^{7,10}$]dodeca-3-ene, 8-methyl-8-methoxycarbonyl tetracyclo[4.4.0.1$^{2,5}$.1$^{7,10}$]dodeca-3-ene, 8-methyl-8-ethoxycarbonyl tetracyclo[4.4.0.1$^{2,5}$.1$^{7,10}$]dodeca-3-ene, 8-methyl-8-n-propoxycarbonyl tetracyclo[4.4.0.1$^{2,5}$.1$^{7,10}$]dodeca-3-ene, 8-methyl-8-isopropoxycarbonyl tetracyclo[4.4.0.1$^{2,5}$.1$^{7,10}$]dodeca-3-ene, 8-methyl-8-n-butoxycarbonyl tetracyclo[4.4.0.1$^{2,5}$.1$^{7,10}$]dodeca-3-ene, 8-(2,2,2-trifluoroethoxycarbonyl) tetracyclo[4.4.0.1$^{2,5}$.1$^{7,10}$]dodeca-3-ene, 8-methyl-8-(2,2,2-trifluoroethoxycarbonyl) tetracyclo[4.4.0.1$^{2,5}$.1$^{7,10}$]dodeca-3-ene, or the like.

The cyclic olefin having an N-substituted imide group may include, for example, N-(4-phenyl)-(5-norbornene-[0046] 2,3-dicarboxyimide), or the like.

The cyclic olefin having a cyano group may include, for example, 8-cyano tetracyclo[4.4.0.1$^{2,5}$.1$^{7,10}$]dodeca-3-ene, 8-methyl-8-cyano tetracyclo[4.4.0.1$^{2,5}$.1$^{7,10}$]dodeca-3-ene, 5-cyano bicyclo[2.2.1]hepto-2-ene, or the like.

The cyclic olefin having a halogen atom may include, for example, 8-chloro tetracyclo[4.4.0.1$^{2,5}$.1$^{7,10}$]dodeca-3-ene, 8-methyl-8-chloro tetracyclo[4.4.0.1$^{2,5}$.1$^{7,10}$]dodeca-3-ene, or the like.

In addition, examples of the vinyl alicyclic hydrocarbon monomer may include vinylcyclo alkane such as vinylcyclo propane, vinylcyclo butane, vinylcyclo pentane, vinylcyclo hexane, vinylcyclo heptane, etc.; vinylcyclo alkane having a substituent such as 3-methyl-1-vinylcyclo hexane, 4-methyl-1-vinylcyclo hexane, 1-phenyl-2-vinylcyclo propane, 1,1-diphenyl-2-vinylcyclo propane, etc.

Examples of the vinyl aromatic hydrocarbon monomer may include vinyl aromatic compounds such as styrene, 1-vinylnaphthalene, 2-vinylnaphthalene, 3-vinylnaphthalene, etc.; vinyl aromatic compounds having a substituent such as 3-methylstyrene, 4-propylstyrene, 4-cyclohexylstyrene, 4-dodecylstyrene, 2-ethyl-4-benzylstyrene, 4-(phenylbutyl)styrene, etc.; multifunctional vinyl aromatic compounds such as m-divinylbenzene, p-divinylbenzene, bis(4-vinylphenyl)methane, etc.

Examples of the chain olefin may include ethylene; α-olefin having 2 to 20 carbon atoms such as propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene, 1-eicosene, etc.; nonconjugated diene such as 1,4-hexadiene, 4-methyl-1,4-hexadiene, 5-methyl-1,4-hexadiene, 1,7-octadiene. etc. These monomers may be used alone or in combination of two or more thereof.

The cyclic olefin polymer of the present invention may be formed by polymerizing any of the above-described monomers in any combination. When the cyclic structure of the obtained polymer has an unsaturated bond, it may be hydrogenated to form a saturated cyclic structure.

A polymerization method of each of the monomers may be carried out according to the conventional method, and for example, a ring-opening polymerization method or an addition polymerization method is employed. As a polymerization catalyst, metal complexes such as molybdenum, ruthenium, osmium, etc. are suitably used. These polymerization catalysts may be used alone or in combination of two or more thereof. For example, when obtaining a ring-opened (co)polymer of the cyclic olefin monomer, an amount of the polymerization catalyst is commonly in a range of 1:100 to 1:2,000,000 in terms of a molar ratio of the metal compound to the cyclic olefin monomer in the polymerization catalyst, preferably, 1:500 to 1:1,000,000, and more preferably, 1:1,000 to 1:500,000.

As a modifying agent for introducing the protonic polar group into the cyclic olefin polymer having no protonic polar group, a compound having a reactive carbon-carbon unsaturated bond and a protonic polar group in one molecule is generally used. Specific examples of such a compound may include unsaturated carboxylic acids such as acrylic acid, methacrylic acid, angelic acid, tiglic acid, oleic acid, elaidic acid, erucic acid, brassidic acid, maleic acid, fumaric acid, citraconic acid, mesaconic acid, itaconic acid, atropic acid, cinnamic acid, etc.; unsaturated alcohols such as allyl alcohol, methylvinyl methanol, crotyl alcohol, methallyl alcohol, 1-phenylethene-1-ol, 2-propan-1-ol, 3-butene-1-ol, 3-butene-2-ol, 3-methyl-3-butene-1-ol, 3-methyl-2-butene-1-ol, 2-methyl-3-butene-2-ol, 2-methyl-3-butene-1-ol, 4-pentene-1-ol, 4-methyl-4-pentene-1-ol, 2-hexene-1-ol, etc. A modification reaction may be carried out according to the conventional method, and commonly performed in the presence of a radical generator. These modifying agents may be used alone or in combination of two or more thereof.

In a method of preparing the cyclic olefin polymer containing a protonic polar group, a precursor thereof may be used instead of the protonic polar group. That is, a monomer having a precursor of a protonic polar group thereof may be used instead of the monomer having a protonic polar group. As the modifying agent, a modifying agent having a precursor thereof may be used instead of the protonic polar group.

The precursor of the protonic polar group is converted to a protonic polar group by a chemical reaction such as decomposition or hydrolysis due to light or heat according to types thereof.

For example, when the protonic polar group in the cyclic olefin polymer containing a protonic polar group is employed as a carboxyl group, an ester group may be used as a precursor of the protonic polar group, and then converted to an appropriate carboxyl group.

Commonly, the cyclic olefin polymer used in the present invention has a weight average molecular weight (Mw) of 1,000 to 1,000,000, preferably, 5,000 to 150,000, and more preferably, 2,000 to 10,000.

A molecular weight distribution of the cyclic olefin polymer used in the present invention is commonly 4 or less in terms of a ratio of weight average molecular weight to number average molecular weight (Mw/Mn), preferably, 3 or less, and more preferably, 2.5 or less.

Commonly, the cyclic olefin polymer used in the present invention has an iodine value of 200 or less, preferably, 50 or less, and more preferably, 10 or less. When the cyclic olefin polymer has the iodine value within the above range, it is particularly preferable due to excellent heat-resistant shape retention.

A thickness of the protective layer 30 is not particularly limited, and may be 0.5 to 100 μm. If the thickness thereof is less than 0.1 μm, cracks may occur during peeling-off from the carrier substrate. If the thickness thereof exceeds 100 μm, a white cast phenomenon may occur due to defective application.

The electrode pattern layer 40 is disposed on the protective layer 30.

The electrode pattern layer 40 includes sensing electrodes for sensing a touch, and pad electrodes.

The sensing electrodes and the pad electrodes may be located in a sensing area and a pad area on the separation layer, respectively. However, since it is necessary for the sensing electrodes and the pad electrodes to be electrically connected with each other, at least a part of the sensing electrodes may be located in the pad area, and at least a part of the pad electrodes may be located in the sensing area.

Herein, the sensing area refers to an area corresponding to a display part on which the touch is executed in the film touch sensor, and the pad area refers to an area corresponding to a pad part. That is, the sensing area on the separation layer refers to an area corresponding to the display part on the separation layer, and the pad area refers to an area corresponding to the pad part on the separation layer.

The sensing electrode and the pad electrode of the electrode pattern layer 40 may use any material without limitation thereof so long as it is a conductive material, and may be made of, for example, a material selected from metal oxides selected from a group consisting of indium tin oxide (ITO), indium zinc oxide (IZO), indium zinc tin oxide (IZTO), aluminum zinc oxide (AZO), gallium zinc oxide (GZO), fluorine tin oxide (FTC)), indium tin oxide-silver-indium tin oxide (ITO-Ag-ITO), indium zinc oxide-silver-indium zinc oxide (IZO-Ag-IZO), indium zinc tin oxide-silver-indium zinc tin oxide (IZTO-Ag-IZTO), and aluminum zinc oxide-silver-aluminum zinc oxide (AZO-Ag-AZO); metals selected from a group consisting of gold (Au), silver (Ag), copper (Cu), molybdenum (Mo), and an Ag—Pd—Cu (APC) alloy; metal nanowires selected from a group consisting of gold, silver, copper, and lead; carbon-based materials selected from a group consisting of carbon nanotube (CNT) and graphene; and conductive polymer materials selected from a group consisting of poly (3,4-ethylenedioxythiophene) (PEDOT) and polyaniline (PANI). These compounds may be used alone or in combination of two or more thereof, and preferably, the indium tin oxide is used. Further, both of crystalline indium tin oxide and noncrystalline indium tin oxide may be used.

Unit patterns of the sensing electrode may be each independently a polygonal pattern such as a triangle, quadrangle, pentagon, hexagon, or heptagon or more.

In addition, the sensing electrode may include regular patterns. The regular pattern is referred to that a form of the patterns has regularity. For example, the unit patterns may include each independently a mesh form such as a rectangle or square, or a pattern of a form such as a hexagon.

Further, the sensing electrode may include irregular patterns. The irregular pattern is referred to that the form of the patterns has no regularity.

When the sensing electrode is made of a material such as metal nanowires, carbon-based materials, polymer materials, and the like, the sensing electrode may have a network structure.

When the sensing electrode has the network structure, since a signal is sequentially transferred to adjacent patterns in contact with each other, it is possible to attain patterns having high sensitivity.

A thickness of the sensing electrode is not particularly limited, but a thin film is preferably used as much as possible in consideration of flexibility of the film touch sensor. For example, the sensing electrode may have a thickness of 100 to 500 Å. Meanwhile, in a case of the thin film, an increase in the resistance may be problems, however, since the film touch sensor of the present invention is provided with the above-described electrode pattern layer 40 as a capping layer, it is possible to maintain excellent sensitivity by preventing an increase in the resistance.

The sensing electrodes of the electrode pattern layer 40 are formed in two directions which are different direction from each other in order to sense a touch position, and it is necessary for the electrodes arranged in each direction to be electrically insulated from each other. For this, the electrode pattern layer 40 includes an insulation layer 43, thereby the electrodes arranged in any one direction may be electrically connected with each other through bridge electrodes while maintaining an electrical insulation from the electrodes arranged in the other direction.

An organic insulation material known in the related art may be used to prepare the insulation layer 43 without particular limitation thereof.

A thickness of the insulation layer 43 is not particularly limited, and is commonly in a range of 0.1 to 100 μm, preferably 0.5 to 50 μm, and more preferably 0.5 to 30 μm.

The sensing electrode may include a first pattern 41 formed in a first direction, a second pattern 42 formed by separating unit patterns thereof in a second direction, and bridge patterns 44 connecting the separated unit patterns of the second pattern.

The insulation layer 43 may be located only at an intersect portion of the bridge pattern 44 and the first pattern 41 in an island form, and may be located at a layer including the intersect portion of the bridge pattern 44 and the first pattern 41 in a layer form. When the insulation layer 43 is located in the layer form, the bridge pattern 44 may be connected to the second pattern 42 through a contact hole 45 formed in the insulation layer 43.

A lamination sequence of the patterns is not particularly limited, and the first pattern 41 and the second pattern 42, the insulation layer 43, and the bridge pattern 44 may be laminated in this order. Alternatively, the bridge pattern 44, the insulation layer 43, and the first pattern 41 and the second pattern 42 are laminated in this order.

The film touch sensor of the present invention may further include a base film 50 attached to an upper side of the electrode pattern layer 40.

The base film 50 may use a transparent film made of any material widely used in the related art without particular limitation thereof. For example, the base film may be made of any one selected from a group consisting of cellulose ester (for example: cellulose triacetate, cellulose propionate, cellulose butyrate, cellulose acetate propionate and nitrocellulose), polyimide, polycarbonate, and polyester (for example: polyethylene terephthalate, polyethylene naphthalate, poly-1,4-cyclohexane dimethyl terephthlate, polyethylene 1,2-diphenoxyethane-4,4'-dicarboxylate and polybutylene terephthalate), polystyrene (for example: syndiotactic polystyrene), polyolefin (for example: polypropylene, polyethylene and polymethylpentene), polysulfone, polyethersulfone, polyarylate, polyether-imide, polymethyl methacrylate, polyether ketone, polyvinyl alcohol and polyvinyl chloride, which may be used alone or as a mixture thereof.

Further, the transparent film may be an isotropic film or a retardation film.

When the transparent film is the isotropic film, an in-plane retardation (Ro, Ro=[nx−ny]×d], nx and ny represent a main refractive index of a film plane (in-plan refractive index), nz represents a refractive index in a thickness direction of the film, and d represents a thickness of the film) is 40 nm or less, and preferably, 15 nm or less, and a retardation in a thickness direction (Rth, Rth=[(nx+ny)/2−nz]×d) ranges from −90 nm to +75 nm, preferably, −80 nm to +60 nm, and more preferably, −70 nm to +45 nm.

The retardation film is a film fabricated by processes including mono-axial stretching or biaxial stretching of a polymer film, polymer coating, and liquid crystal coating, and is generally used to enhance and control optical characteristics such as compensation for a viewing angle, enhancement of color sensitivity, enhancement of light leakage, control of a color taste in a display.

Further, as the base film 50, a polarizing plate may also be used.

The polarizing plate may be a type in which a polarizer protective film is attached to one surface or both surfaces of a polyvinyl alcohol polarizer.

Further, as the base film 50, a protective film may also be used.

The protective film may be a film in which an adhesive layer is formed on at least one surface of a film made of a polymer resin or a film having self-adhesion such as polypropylene, and may be used to protect a surface of the film touch sensor and enhance workability.

Preferably, the base film 50 has light transmittance of 85% or more, and preferably 90% or more. Further, the base film 50 preferably has a total Haze value of 10% or less, and preferably, 7% or less, which is measured by JIS K7136.

A thickness of the base film 50 is not limited, but is preferably, 30 to 150 μm, and more preferably, 70 to 120 μm.

The base film 50 may be attached through a pressure-sensitive adhesive layer 60.

The pressure-sensitive adhesive layer 60 refers to an adhesive layer or bonding layer.

As an adhesive or bonding agent, any conventional adhesive or bonding agent known in the related art may be used without particular limitation thereof. For example, thermosetting or photo-curable adhesive or bonding agent such as polyester, polyether, urethane, epoxy, silicone, acrylic adhesive or bonding agent may be used.

The film touch sensor of the present invention may further include a passivation layer 70 between the electrode pattern layer 40 and the base film 50.

The passivation layer 70 serves to prevent the electrode pattern layer 40 from being contaminated by exposing to an external environment (water, air, etc.).

The passivation layer 70 may be formed in a desired pattern using metal oxide such as silicon oxide, a transparent photosensitive resin composition containing an acrylic resin, a thermosetting resin composition, or the like.

The passivation layer 70 may have an appropriate thickness, for example, 2,000 nm or less. Thus, for example, the thickness thereof may be 0 to 2,000 nm.

In addition, the present invention has an object to provide an image display device including the above-described film touch sensor.

The film touch sensor of the present invention may be applicable to typical liquid crystal display devices, in addition, other different image display devices such as an electro-luminescent display device, plasma display device, electro-luminescent emission display device, or the like.

Further, the film touch sensor of the present invention has excellent bending properties, such that the display image device may be a flexible image display device.

Furthermore, the present invention provides a method for fabricating a film touch sensor.

Figure 3:
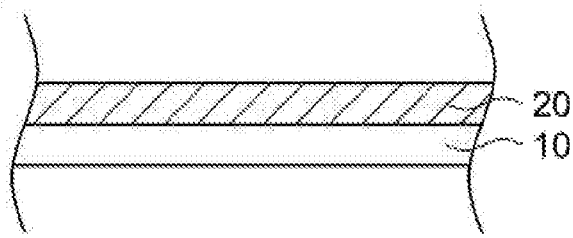
FIG. 3 is a schematic view illustrating processes of a to method for fabricating the film touch sensor according to one embodiment of the present invention.
Figure 3:
Figure 3:
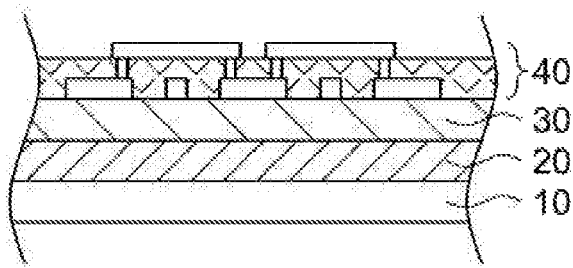
Figure 3:
Figure 3:
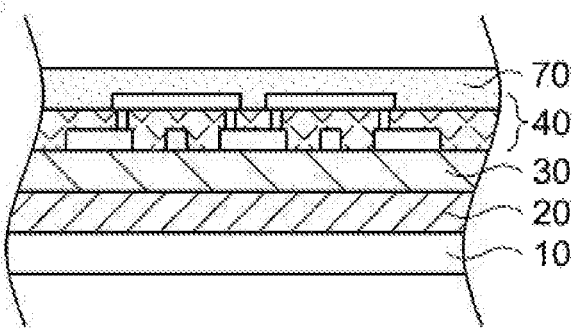
Figure 3:
Figure 4:
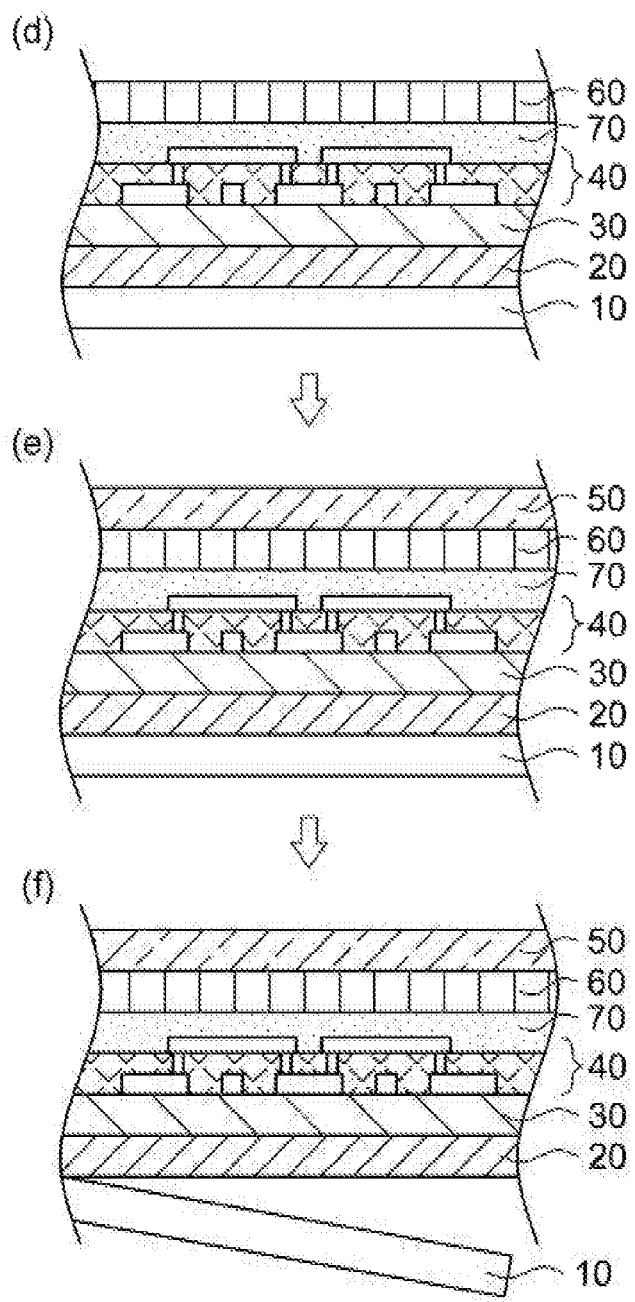
FIG. 4 is a schematic view illustrating processes of a method for fabricating the film touch sensor according to another embodiment of the present invention.

FIGS. 3 and 4 are schematic views illustrating processes of the method for fabricating a film touch sensor according to one embodiment of the present invention, which illustrate one embodiment when including steps of forming a passivation layer and attaching a base film to be described below, but the present invention is not limited thereto.

Hereinafter, the method for fabricating a film touch sensor of the present invention will be described in detail with reference to accompanying FIGS. 3 and 4.

First, as illustrated in (a) of FIG. 3, a separation layer 20 is formed on a carrier substrate 10.

The carrier substrate 10 may be made of any material without particular limitation thereof so long as it provides a proper strength with little effect on heat and chemical treatments, so that the substrate is not easily bent or distorted during processing but may be fixed. For example, glass, quartz, silicon wafer, SUS, etc. may be used, and glass is preferably used.

The separation layer 20 may be made of the above-described polymer material.

When the electrode pattern layer 40 is made of metal materials, peeling-off from the carrier substrate 10 may be difficult. But, since the separation layer 20 may be easily peeled-off form the carrier substrate 10, during forming the separation layer 20, it is possible to reduce a problem such as a damage in the electrode pattern layer 40 due to a decreased impact applied to the touch sensor during peeling-off from the carrier substrate 10.

In an aspect of minimizing a physical damage applied during peeling-off, preferably, the separation layer 20 has a peel-off strength of 1 N/25 mm or less with respect to the carrier substrate 10.

A method of forming the separation layer 20 is not particularly limited, but may include any conventional method known in the related art, for example, slit coating, knife coating, spin coating, casting, micro gravure coating, gravure coating, bar coating, roll coating, wire-bar coating, dip coating, spray coating, screen printing, gravure printing, flexo printing, offset printing, ink-jet coating, dispenser printing, nozzle coating, capillary coating, or the like.

After forming the separation layer 20 by the above-described process, the inventive method may further perform an additional curing process.

A method for curing the separation layer 20 is not particularly limited, but may include photo-curing, thermosetting or both of these processes. In a case of executing both of the photo-curing and the thermosetting processes, the sequence thereof is not particularly limited.

Next, as illustrated in (b) of FIG. 3, a protective layer 30 is formed on the separation layer 20.

The step of forming the protective layer 30 includes applying a protective layer forming composition which contains a polymer having a repeating unit represented by Formula 1 or 2 below on the separation layer 20 and curing the same:

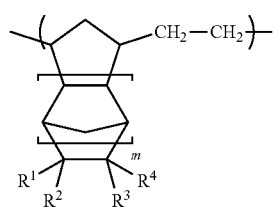

[Formula 1]

(wherein at least one of $R^1$ to $R^4$ is $-X_n-Y_1$, n is 0 or 1, X is an alkylene group or a carbonyl group having 1 to 6 carbon atoms, $Y_1$ is a protonic polar group, the others of $R^1$ to $R^4$ is hydrogen or $-X_n-Y_2$, $Y_2$ is an alkyl group having 1 to 6 carbon atoms, an aryl group having 6 to 12 carbon atoms, or a protonic polar group, wherein the $Y_2$ may be substituted with an alkyl group having 1 to 4 carbon atoms or an aryl group having 6 to 12 carbon atoms, and m is an integer of 0 to 2).

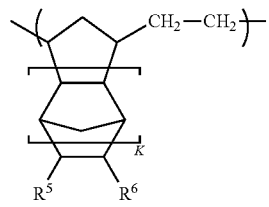

[Formula 2]

(wherein $R^5$ and $R^6$ are connected with each other to form a 3-membered or 5-membered hetero ring which may be substituted with an alkyl group having 1 to 4 carbon atoms or an aryl group having 6 to 12 carbon atoms, and k is an integer of 0 to 2).

The protective layer 30 according to the present invention is the cured layer of a polymer having the repeating unit represented by Formula 1 or 2, and may have excellent elasticity, thus to reduce an occurrence rate of cracks that may occur during peeling-off the film touch sensor from the carrier substrate.

The elastic protective layer 30 may have an elastic modulus of, for example, 2.8 to 4.5 GPa. If the elastic modulus thereof is less than 2.8 GPa, wrinkles may occur in the insulation layer 43 during forming the electrode. If the elastic modulus thereof exceeds 4.5 GPa, cracks may occur during peeling-off from the carrier substrate. The elastic modulus within the above range may be obtained, for example, by setting the post-bake temperature to 180° C. or higher. In an aspect of satisfying an excellent level of wrinkle suppression and peeling inhibition effects, the elastic modulus thereof is preferably 3 to 4.2 GPa.

Polymers having the repeating unit represented by Formula 1 or 2 according to the present invention have a high glass transition temperature. For example, the glass transition temperature may be 100° C. or higher, preferably 150° C. or higher, more preferably 200° C. or higher, and most preferably 250° C. or higher. By having such a high glass transition temperature as described above, the insulation layer including the polymer may have high heat resistance, thus to suppresses heat damage such as wrinkles, cracks, and color change which may occur in the high temperature deposition and annealing processes during forming the sensing electrode such as ITO, or the like.

In addition, the film touch sensor has excellent solvent resistance to various solvents such as an etchant and a developing solution which may be exposed when forming the sensing electrode.

In addition, the protective layer 30 has a very high transmittance. For example, the transmittance thereof may be 90% or more, preferably 95% or more, and more preferably, 97% or more.

Also, the protective layer forming composition according to the present invention may include other components such as a resin component, a cross-linking agent, and other compounding agents other than the cyclic olefin polymer, as desired, within a range in which expression of the desired effects of the present invention is not hindered.

Examples of the resin component other than the cyclic olefin polymer may include a styrene resin, vinyl chloride resin, acrylic resin, polyphenylene ether resin, polyarylene sulfide resin, polycarbonate resin, polyester resin, polyamide resin, polyethersulfone resin, polysulfone resin, polyimide resin, rubber, elastomer, or the like.

As the crosslinking agent, compounds having two or more, and preferably three or more functional groups capable of reacting with the cyclic olefin polymer in a molecule are used. The functional group of the crosslinking agent is not particularly limited so long as it can react with a functional group or an unsaturated bond in the cyclic olefin polymer. When the cyclic olefin polymer has a protonic polar group, preferable examples of the functional group capable of reacting with the polar group may include an amino group, carboxyl group, hydroxyl group, epoxy group, isocyanate group, or the like, and more preferably, the amino group, epoxy group and isocyanate group, and furthermore preferably, the epoxy group.

Specific examples of such the crosslinking agent may include aliphatic polyamines such as hexamethylene diamine; aromatic polyamines such as 4,4'-diaminodiphenyl ether and diaminodiphenyl sulfone; azides such as 2,6-bis (4'-azidobenzal)cyclohexanone, 4,4'-diazidodiphenylsulfone; polyamides such as nylon, polyhexamethylene diamine terephthalamide, polyhexamethylene isophthalamide, etc.; melamines such as N,N,N',N',N",N"-(hexaalkoxymethyl)melamine, etc.; glycollauryls such as N,N',N"',N"''-(tetraalkoxy methyl)glycollauryl, etc.; acrylate compounds such as ethyleneglycol di(meth)acrylate, etc.; isocyanate compounds such as hexamethylene diisocyanate polyisocyanate, isophorone diisocyanate polyisocyanate, tolylene diisocyanate polyisocyanate, hydrogenated diphenylmethane diisocyanate, etc.; various polyfunctional epoxy compounds such as 1,4-di-(hydroxymethyl)cyclohexene, 1,4-di-(hydroxymethyl)norbornene; 1,3,4-trihydroxycyclohexene, etc.

Specific examples of the polyfunctional epoxy compound may include, as an epoxy compound having two or more epoxy groups, and preferably, three or more epoxy groups, a compound having an alicyclic structure, compound having a cresol novolac skeleton, compound having a phenol novolac skeleton, compound having a bisphenol A skeleton, compound having a naphthalene skeleton, or the like. Among them, a polyfunctional epoxy compound having an alicyclic structure and having two or more, and more preferably three or more epoxy groups is preferably used, because of good compatibility with the cyclic olefin polymer.

Among the above-described compounds, the polyfunctional epoxy compound is suitable as the crosslinking agent. Specific examples thereof may include a bisphenol A type epoxy resin, bisphenol F type epoxy resin, phenol novolac type epoxy resin, cresol novolac type epoxy resin, polyphenol type epoxy resin, cyclic aliphatic epoxy resin, aliphatic glycidyl ether, epoxy acrylate polymer, or the like.

The molecular weight of the crosslinking agent is not particularly limited, but is commonly 100 to 100,000, preferably 500 to 50,000, and more preferably, 1,000 to 10,000. The crosslinking agents may be used alone or in combination of two or more thereof.

Examples of the other compounding agent may include sensitizers, surfactants, potential acid generators, antistatic agents, antioxidants, adhesion promoters, antifoaming agents, pigments, dyes, and the like.

Specific examples of the sensitizer may include 2H-pyrid-(3,2-b)-1,4-oxazine-3 (4H)-ones, 10H-pyrid-(3,2-b)-1,4-benzothiazines, urazols, hydantoins, barbituric acids, glycine anhydrides, 1-hydroxybenzotriazoles, alloxans, maleimides, and the like.

The surfactant is used for the purpose of prevention of striation (coating line strike), improvement of developability, and the like. Specific examples thereof may include polyoxyethylene alkylethers such as polyoxyethylene laurylether, polyoxyethylene stearylether and polyoxyethylene oleyleneether, etc.; polyoxyethylene arylethers such as polyoxyethylene octylphenylether, polyoxyethylene nonylphenylether, etc.; polyoxyethylene dialkylesters such as polyoxyethylene dilaurate, etc.; nonionic surfactants such as polyoxyethylene dialkylesters, etc.; fluorine surfactants; silicone surfactants; methacrylic acid copolymer surfactants; acrylic acid copolymer surfactant, and the like.

The potential acid generator is used for the purpose of improving the heat resistance and chemical resistance of the protective layer forming composition according to the present invention.

Specific examples of the potential acid generators may include sulfonium salts, benzothiazolium salts, ammonium salts, phosphonium salts, and the like, which are cationic polymerization catalysts that generate acids by heating. Among them, the sulfonium salts and benzothiazolium salts are preferably used.

Another example of the other compounding agent may include any compound known in the related art.

A form of the protective layer forming composition according to the present invention is not particularly limited, and may be a solution, dispersion or solid. The protective layer forming composition according to the present invention is suitably used in the form of the solution or dispersion.

The method of preparing the protective layer forming composition according to the present invention is not particularly limited, and it is preferable to mix the respective components (the polymer, radiation-sensitive compound, and other components, as desired) of the protective layer forming composition according to the present invention with each other. However, the protective layer forming composition may be suitably prepared by dissolving or dispersing these components in a solvent to obtain a solution or dispersion. The solvent may be removed from the obtained solution or dispersion as necessary.

The solvent used in the present invention is not particularly limited. Specific examples thereof may include alkyleneglycols such as ethyleneglycol, propyleneglycol, diethyleneglycol, triethyleneglycol, tetraethyleneglycol, etc.; alkyleneglycol monoethers such as ethyleneglycol monoethylether, ethyleneglycol propylether, ethyleneglycol mono t-butylether, propyleneglycol ethylether, propyleneglycol monopropylether, propyleneglycol monobutylether, diethyleneglycol monomethylether, diethyleneglycol monoethylether, dipropyleneglycol monomethylether, dipropyleneglycol monoethylether, triethyleneglycol monomethylether, triethyleneglycol monoethylether, tripropyleneglycol monomethylether, tripropyleneglycol monoethylether, etc.; alkyleneglycol dialkylethers such as diethyleneglycol dimethylether, diethyleneglycol diethylether, diethyleneglycol ethylmethylether, dipropyleneglycol dimethylether, dipropyleneglycol diethylether, dipropyleneglycol ethylmethylether, triethyleneglycol dimethylether, triethyleneglycol diethylether, triethyleneglycol ethylmethylether, tripropyleneglycol ethylmethylether, etc.; alkyleneglycol monoalkyletheresters such as propyleneglycol monomethylether acetate, dipropyleneglycol monomethylether acetate, propyleneglycol monoethylether acetate, propyleneglycol mono n-propylether acetate, propyleneglycol mono i-propylether acetate, propyleneglycol mono n-butylether acetate, propyleneglycol mono i-butylether acetate, propyleneglycol mono sec-butylether acetate, propyleneglycol mono t-butylether acetate, etc.; ketones such as methylethylketone, 2-heptaneone, 4-hydroxy-4-methyl-2-pentanone, cyclohexanone, cyclopentanone, etc.; alcohols such as methanol, ethanol, propanol, butanol, 3-methoxy-3-methylbutanol, etc.; cyclic ethers such as tetrahydrofuran, dioxane, etc.; cellosolve esters such as methyl cellosolve acetate, ethyl cellosolve acetate, etc.; aromatic hydrocarbons such as benzene, toluene, xylene, etc.; esters such as ethyl acetate, butyl acetate, ethyl lactate, methyl 2-hydroxy-2-methylpropionate, ethyl 2-hydroxy-2-methylpropionate, ethyl ethoxyacetate, ethyl hydroxyacetate, methyl 2-hydroxy-3-methyl butyl phosphate, methyl 3-methoxypropionate, ethyl 3-methoxypropionate, ethyl 3-ethoxypropionate, methyl 3-ethoxypropionate, γ-butyrolactone etc.; amides such as N-methylformamide, N,N-dimethylformamide, N-methyl-2-pyrrolidone, N-methylacetoamide, N,N-dimethylacetoamide, etc.; sulfoxides such as dimethyl sulfoxide, or the like.

These solvents may be used alone or in combination of two or more thereof. An amount of the solvent to be used is commonly 20 to 10,000 wt. parts to 100 wt. parts of the polymer, preferably, 50 to 5,000 wt. parts, and more preferably, 100 to 1,000 wt. parts.

The method of dissolving or dispersing the respective components constituting the protective layer forming composition according to the present invention in a solvent may be carried out according to the conventional method. Specifically, the method may be carried out by using stirring with a stirrer and magnetic stirrer, high-speed homogenizer, disperser, oil-based stirrer, biaxial stirrer, ball mill, roll mill or the like. After dissolving or dispersing the respective components in the solvent, the components may be filtered using, for example, a filter having a pore diameter of about 0.5 μm.

When dissolving or dispersing the respective components constituting the radiation-sensitive resin composition of the present invention in the solvent, a solid content concentration is commonly 1 to 70 wt. %, preferably 5 to 50 wt. %, and more preferably 10 to 40%. When the solid concentration is within the above range, the stability of dissolution, coating property on the substrate, film thickness uniformity of the formed resin film, flatness, and the like may be highly balanced.

An application method of the protective layer forming composition is not particularly limited, but may include any conventional method known in the related art, for example, slit coating, knife coating, spin coating, casting, micro gravure coating, gravure coating, bar coating, roll coating, wire-bar coating, dip coating, spray coating, screen printing, gravure printing, flexo printing, offset printing, ink-jet coating, dispenser printing, nozzle coating, capillary coating, or the like.

The protective layer 30 may be formed by curing the applied protective layer forming composition.

The curing may be performed by drying the applied protective layer forming composition.

The curing may be performed by a process including, for example, a pre-bake step and a post-bake step.

The pre-bake method is not particularly limited, and for example, may be performed by heating in a hot plate or oven, irradiating with infrared rays, or the like, and preferably is performed by heating in a convection oven.

The pre-bake may be carried out at a temperature of, for example, 100° C. to 120° C. If the temperature is 100° C. or less, the solvent component may remain to cause coating defects. If the temperature exceeds 120° C., the sensitivity may be decreased or transmittance of the insulation layer may be decreased.

The pre-bake may be performed, for example, for 1 minute to 3 minutes. If the pre-bake time is less than 1 minute, the solvent component remains to decrease a residual film ratio, and if it exceeds 3 minutes, the residue remains to cause a difficulty in forming the pattern.

The post-bake method is not particularly limited, and for example, may be performed by heating in a hot plate or oven, irradiating with infrared rays, or the like, and preferably is performed by heating in a convection oven.

The post-bake may be performed at a temperature of, for example, 180° C. to 250° C. If the temperature is less than 180° C., an electrode resistance of the electrode pattern layer 40 may be increased due to an out-gas, and a density thereof may be increased to cause cracks due to having an elastic modulus exceeding 4.5 GPa during peeling-off from the carrier substrate. If the temperature exceeds 250° C., the transmittance may be decreased by a yellowing phenomenon.

The post-bake may be performed for 20 minutes to 60 minutes, for example. If the post-bake time is less than 20 minutes, curing is not sufficiently performed to cause an occurrence of wrinkles in the protective layer 30 when forming the electrode, and if it exceeds 60 minutes, the transmittance may be decreased by the yellowing phenomenon.

Next, as illustrated in (c) of FIG. 3, an electrode pattern layer 40 is formed on the protective layer 30.

More specifically, the step of forming the electrode pattern layer 40 further includes a step of forming a sensing electrode.

The formation sequence thereof is not particularly limited, and the first electrode 41 and the second electrode 42, the insulation layer 43 and the bridge electrode 44 may be formed in this order. Alternately, the bridge electrode 44, the insulation layer 43, and the first electrode 41 and the second electrode 42 are formed in this order.

The sensing electrode may be formed according to the same method as the method of forming the protective layer 30 with the above-described material.

In an aspect of ensuring that the electrode pattern layer 40 has a low resistance, preferably, the electrode pattern layer 40 is formed through a high-temperature process of 150° C. to 250° C. Specifically, the electrode pattern layer 40 may be formed, for example, by a deposition process at 150° C. to 250° C., or may be formed at room temperature deposition, and a heat treatment process at 150° C. to 250° C., but it is not limited thereto.

Next, as illustrated in (f) of FIG. 4, the separation layer 20 is peeled-off from the carrier substrate 10.

A laminate in which the separation layer 20, the protective layer 30, the electrode pattern layer 40 and the insulation layer 43 are laminated on the carrier substrate 10 in this order may be obtained when passing through the above-described processes. Then, the separation layer 20 is peeled-off from the carrier substrate 10, such that the laminate may be used as the film touch sensor.

The method for fabricating a film touch sensor of the present invention may further include a step of attaching the base film 50 on the electrode pattern layer 40 as illustrated in (d) and (e) of FIG. 4. Specifically, the inventive method may further include a step of forming a pressure-sensitive adhesive layer 60 on the electrode pattern layer 40, and a step of attaching the base film 50 on the pressure-sensitive adhesive layer 60.

In this case, the peeling-off process may be performed before or after the attachment of the base film 50. FIG. 4 illustrates a case in which the peeling-off process is performed after the base film 50 is attached.

The pressure-sensitive adhesive layer 60 may be made of the above-described adhesive or bonding agent, and may be formed by applying the adhesive or bonding agent to the electrode pattern layer 40 by using the method such as slit coating, knife coating, spin coating, casting, micro gravure coating, gravure coating, bar coating, roll coating, wire-bar coating, dip coating, spray coating, screen printing, gravure printing, flexo printing, offset printing, ink-jet coating, dispenser printing, nozzle coating, capillary coating, or the like, and then drying and curing the same.

It is preferable that the pressure-sensitive adhesive layer 60 has the elastic modulus and peel-off strength within above-described ranges in an aspect of suppressing an occurrence of cracks in the film touch sensor during the peeling-off process.

In addition, the inventive method may further include a step of forming a passivation layer 70 on the electrode pattern layer 40 as illustrated in (c) of FIG. 3.

The passivation layer 70 may be formed according to the same method as the method of forming the protective layer 30 with the above-described material.

As described above, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

Synthesis Example 1

60 parts of 8-hydroxycarbonyl tetracyclododecene, 40 parts of N-phenyl-(5-norbornene-2,3-dicarboxy imide), 1.3 parts of 1-hexene, 0.05 parts of (1,3-dimethyl imidazolidin- 2-ylidene) (tricyclohexyl phosphine)benzylidene ruthenium dichloride, and 400 parts of tetrahydrofuran were put into a nitrogen-substituted glass pressure reactor, and reacted at 70° C. for 2 hours while stirring to obtain a resin solution (a) (solid concentration: about 20%). The resin solution (a) was transferred into an autoclave equipped with a stirrer, and reacted at a hydrogen pressure of 4 MPa and a temperature of 150° C. for 5 hours to obtain a resin solution (b) containing a hydrogenated resin (hydrogenation rate: 99%). Then, 100 parts of the resin solution (b) and 1 part of activated charcoal powders were put into an autoclave made of a heat-resistant agent, and reacted at 150° C. under a hydrogen pressure of 4 MPa for 3 hours. After completion of the reaction, the reactant was filtered with a filter made of a fluorine resin having a pore diameter of 0.2 μm to separate the activated charcoal, and thereby a resin solution (c) was obtained. In this case, the solution was filtered smoothly. Subsequently, the resin solution (c) was added into ethyl alcohol. The prepared pieces were dried to obtain a resin (1). The resin (1) had an Mw of 5,500 and an Mn of 3,200 in terms of polyisoprene. In addition, the hydrogenation rate was 99%.

The weight average molecular weight (Mw) of the resin (1) was measured by a GPC method under the following conditions.

Apparatus: HLC-8120 GPC (manufactured by Doso Co. Ltd.)
Column: TSK-GELG4000HXL+TSK-GELG2000HXL (series connection)
Column temperature: 40° C.
Mobile phase solvent: Tetrahydrofuran
Flow rate: 1.0 ml/min
Input amount: 50 μl
Detector: RI
Concentration of measured sample: 0.6 wt. % (solvent=tetrahydrofuran)
Standard substance for calibration: TSK STANDARD POLYSTYRENE F-40, F-4, F-1, A-2500, and A-500 (manufactured by Doso Co. Ltd.)

Synthesis Example 2

100 parts of 8-methyl-8-methoxycarbonyl tetracyclo[4.4.0.1$^{2,5}$.1$^{7,10}$]dodeca-3-ene, 1.3 parts of 1-hexene, 0.05 parts of 1,3-dimethyl imidazolidin-2-ylidene(tricyclohexyl phosphine)benzylidene ruthenium dichloride, and 400 parts of cyclohexene were put into a nitrogen-substituted glass pressure to reactor. The mixture was subjected to polymerization reaction and hydrogenation reaction according to the same method as Synthesis Example 1 to obtain a resin (A). The resin (A) had an Mw of 5,300 and an Mn of 3,200. In addition, the hydrogenation rate was 99%. Next, 100 parts of the resin (A) obtained above, 100 parts of N-methyl pyrrolidone, 500 parts of propyleneglycol, and 84.5 parts of 85% potassium hydroxide were added to the reactor. The mixture was heated and stirred at 190° C. for 4.5 hours. The obtained reactant was poured into a mixed solution of a large amount of water, tetrahydrofuran and hydrochloric acid to coagulate the hydrolysate. The coagulated polymer was washed with water and dried to obtain a hydrolyzed resin (2). The hydrolysis rate of the resin (2) was 95%.

Synthesis Example 3

100 parts of 5-(2-hydroxyethoxycarbonyl) bicyclo[2.2.1]hepto-2-ene, 1.3 parts of 1-hexene, 0.05 parts of 1,3-dimethyl imidazolidin-2-ylidene(tricyclohexyl phosphine)benzylidene ruthenium dichloride, and 400 parts of tetrahydrofuran were put into a nitrogen-substituted glass pressure reactor. The mixture was subjected to polymerization reaction and hydrogenation reaction according to the same method as Synthesis Example 1 to obtain a resin (3). The resin (3) had an Mw of 5,500 and an Mn of 3,300. In addition, the hydrogenation rate was 99%.

Synthesis Example 4

100 parts of 8-ethylidene-tetracyclo[4.4.0.1$^{2,5}$.1$^{7,10}$]deca-3-ene, 1.3 parts of 1-hexene, 0.05 parts of 1,3-dimethyl imidazolidin-2-ylidene(tricyclohexyl phosphine)benzylidene ruthenium dichloride, and 400 parts of cyclohexene were put into a nitrogen-substituted glass pressure reactor. The mixture was subjected to polymerization reaction and hydrogenation reaction according to the same method as Synthesis Example 1 to obtain a resin (B). The resin (B) had an Mw of 5,500 and an Mn of 3,200. In addition, the hydrogenation rate was 99%.

Synthesis Example 5

A flask provided with a stirrer, a thermometer, a reflux cooling pipe, a dropping lot and a nitrogen introduction line was prepared, and 45 wt. parts of N-benzyl maleimide, 45 wt. parts of methacrylic acid, 10 wt. parts of tricyclodecyl methacrylate, 4 wt. parts of t-butyl peroxy-2-ethylhexanoate, 40 wt. parts of propyleneglycol monomethylether acetate (hereinafter referred to as "PGMEA") were put into the flask, followed by stirring and mixing to prepare a monomer dropping lot. Then, 6 wt. parts of n-dodecanethiol and 24 wt. parts of PGMEA were added and mixed while stirring to prepare a chain transfer agent dropping lot.

Thereafter, 395 wt. parts of PGMEA was introduced into the flask, the atmosphere in the flask was changed from air to nitrogen, and then the temperature of the flask was raised to 90° C. while stirring. Subsequently, the monomer and chain transfer agent were dropped from the dropping lot. Dropwise addition was performed for 2 h while maintaining the temperature at 90° C., respectively, and the temperature was raised to 110° C. after 1 h, then was maintained for 3 h. Thereafter, a gas introduction tube was introduced to bubble a mixed gas of oxygen/nitrogen=5/95 (v/v). Subsequently, 10 wt. parts of glycidyl methacrylate, 0.4 wt. parts of 2,2'-methylenebis(4-methyl-6-t-butylphenol), and 0.8 wt. parts of triethylamine were put into the flask and reacted at 110° C. for 8 hours, followed by cooling to room temperature to obtain a reactive alkaline soluble resin having a solid content of 29.1 wt. % and a weight average molecular weight of 32,000 and an acid value of 114 mgKOH/g.

Synthesis Example 6

A flask provided with a stirrer, a thermometer, a reflux cooling pipe, a dropping lot and a nitrogen introduction line was prepared, and 300 wt. parts of propyleneglycol monomethylether acetate was put into the flask, and heated to 75° C. while stirring. Then, a solution prepared by dissolving 62.5 wt. parts of 3, 4-epoxy-8-(acryloyloxy) tricycloyl [5.2.1.0$^{2,6}$]decane (EDCPA), 15.1 wt. parts of acrylic acid (AA), and 22.4 wt. parts of vinyl toluene in 170 wt. parts of PGMEA was added dropwise for 5 hours using a dropping lot.

Meanwhile, a solution prepared by dissolving 30 wt. parts of azobisisobutyronitrile as a polymerization initiator in 200 wt. parts of PGMEA was added dropwise over 5 hours using a separate dropping lot. After completion of the dropwise addition of the polymerization initiator, the temperature was maintained for about 4 hours, followed by cooling to room temperature to obtain a non-reactive alkaline soluble resin having a solid content of 37.6 wt. %, a weight average molecular weight of 10,740, and an acid value of 111 mgKOH/g.

EXAMPLES AND COMPARATIVE EXAMPLES (1) Protective Layer Forming Composition

The components listed in Table 1 below were mixed in the indicated amounts (wt. parts), and then diluted with a solvent so as to be a total solid content of 20 wt. % and stirred to prepare a protective layer forming composition.

TABLE 1

| Item | Polymeric compound (A) | | | | | | Solvent (B) | Additive (D) | |
|---|---|---|---|---|---|---|---|---|---|
| | A-1 | A-2 | A-3 | A-4 | A-5 | A-6 | MEDG | C-1 | C-2 |
| Example 1 | 17 | — | — | — | — | — | 79.5 | 0.5 | 2.5 |
| Example 2 | — | 17 | — | — | — | — | 79.5 | 0.5 | 2.5 |
| Example 3 | — | — | 17 | — | — | — | 79.5 | 0.5 | 2.5 |
| Example 4 | — | — | — | 17 | — | — | 79.5 | 0.5 | 2.5 |
| Example 5 | — | 8.5 | 8.5 | — | — | — | 79.5 | 0.5 | 2.5 |
| Example 6 | 8.5 | — | 8.5 | — | — | — | 79.5 | 0.5 | 2.5 |
| Example 7 | 17 | — | — | — | — | — | 79.5 | 0.5 | 2.5 |
| Example 8 | 17 | — | — | — | — | — | 79.5 | 0.5 | 2.5 |
| Example 9 | 17 | — | — | — | — | — | 79.5 | 0.5 | 2.5 |
| Comparative Example 1 | — | — | — | — | 17 | — | 79.5 | 0.5 | 2.5 |
| Comparative Example 2 | — | — | — | — | — | 17 | 79.5 | 0.5 | 2.5 |

A-1: polymer of Synthesis Example 1
A-2: polymer of Synthesis Example 2
A-3: polymer of Synthesis Example 3
A-4: polymer of Synthesis Example 4
A-5: polymer of Synthesis Example 5
A-6: polymer of Synthesis Example 6
B: Diethylene Glycol Methyl Ethyl Ether
C-1: F-554, DIC
C-2: EPHE-3150CE, Dicel (2) Film Touch Sensor A soda lime glass having a thickness of 700 μm was used as a carrier substrate, and a composition for forming a separation layer, which is prepared by diluting 50 wt. parts of melamine resin and 50 wt. parts of cinnamate resin in propyleneglycol monomethylether acetate (PGMEA) in a concentration of 10 wt. %, was applied to the carrier substrate at a thickness of 300 nm by a coater, and dried at 150° C. for 30 minutes to form a separation layer.

Then, the protective layer forming compositions prepared in the examples and comparative examples were applied to the separation layer to form a protective layer, respectively. In particular, the composition was applied at a thickness of 2 μm with a spin coater and pre-baked at 110° C. for 2 minutes in a convection oven. Thereafter, post-bake was performed at 230° C. for 30 minutes in the convection oven to form a protective layer.

However, in Examples 7, 8 and 9, the post-bake temperature was set to be 170° C., 180° C. and 260° C., respectively.

Thereafter, ITO was deposited on the protective layer at a thickness of 35 nm at room temperature of 25° C., and the ITO layer was annealed at 230° C. for 30 minutes to form first and second patterns. An insulation layer was formed with an acrylic insulation material. Then, a bridge pattern was formed on the insulation layer with silver, copper, and a palladium alloy, and was connected to the second pattern through a contact hole formed in the insulation layer.

Then, a passivation layer was formed on the electrode pattern layer with a silicon insulation material ($SiO_2$).

Thereafter, an adhesive composition, which includes 50 wt. parts of CEL2021P ((3,4-epoxycyclohenaxane)methyl 3,4-epoxy cyclohexylcarboxylate) containing SP500 as a polymerization initiator and KRM230 as a leveling agent, 20 wt. parts of neopentyl glycol diglycidyl ether (NPGDGE), 10 wt. parts of 1,6-hexanediol diacrylate, 5 wt. parts of trimethylolpropane triacrylate, 10 wt. parts of KRM0273 as an adhesion promoter, and 5 wt. parts of 4-HBVE as diluted monomer, was applied on the passivation layer between a TAC film having a thickness of 60 μm and the insulation layer by a spuit, and pressed by a roll laminator to form an adhesive layer so as to have a thickness of 2 μm. The adhesive layer was irradiated with UV rays having an intensity of 10 mW/cm$^2$ for 100 seconds to closely contact with each other, dried in an oven at 80° C. for 10 minutes, and then left at room temperature.

EXPERIMENTAL EXAMPLE

1. Measurement of Transmittance

As an independent process from the film touch sensor prepared in the examples and comparative examples, only a protective layer was formed on a soda lime glass having a thickness of 700 μm by the same manner as the examples and comparative examples. The transmittance of light at a wavelength of 550 nm of the insulating layer was measured using a spectrophotometer (U3210, manufactured by Hitachi, Co.). Measured results are shown in Table 2 below.

2. Measurement of Elastic Modulus

As an independent process from the film touch sensor prepared in the examples and comparative examples, only an insulation layer was formed on a soda lime glass having a thickness of 700 μm by the same manner as the examples and comparative examples. The elastic modulus was measured according to the method of KS M ISO 6721-4. Measured results are shown in Table 2 below.

3. Evaluation of whether Cracking occurs after Peeling-Off

A 3M #55 tape (having a width of 25 mm and a length of 10 cm) was stuck on the film touch sensors prepared in the examples and comparative examples, respectively, and then cut around the tape (width of 25 mm) with a cutter. The end of the tape was held and the film touch sensor was peeled-off from the carrier substrate to visually observe whether a crack occurs in the coated film transferred to the tape according to the following standards, and measured results are shown in Table 2 below.

○: state of no crack
x: state of occurring cracks

4. Evaluation of Thermal Stability

As an independent process from the film touch sensor prepared in the examples and comparative examples, only a protective layer was formed on a soda lime glass having a thickness of 700 μm as a carrier substrate by the same manner as the examples and comparative examples. Thereafter, the glass was further heated at 230° C. for 20 minutes to measure a change in transmittance according to the following standards, and measured results are shown in Table 2 below.

○: 3ΔT % or less
Δ: 4 to 8ΔT %
x: 9ΔT % or more

5. Evaluation of Solvent Resistance

As an independent process from the film touch sensor prepared in the examples and comparative examples, only a protective layer was formed on a soda lime glass having a thickness of 700 μm as a carrier substrate by the same manner as the examples and comparative examples. Thereafter, the glass was immersed in propyleneglycol monomethylether acetate and heated at 100° C. for 30 minutes, then a change in a thickness of the film before and after the heating was measured according to the following standards, and measured results are shown in Table 2 below.

○: exceeding 98%
Δ: 95% to 98%
x: less than 95%

6. Assessment of ITO Resistance

As an independent process from the film touch sensor prepared in the examples and comparative examples, only a protective layer was formed on a soda lime glass having a thickness of 700 μm as a carrier substrate by the same manner as the examples and comparative examples. Thereafter, ITO sputtering was performed on the insulation layer so as to have a thickness of 1,000 Å, then a change in a film wrinkle state was measured according to the following standards, and measured results are shown in Table 2 below.

○: state of no wrinkle
x: state of occurring wrinkle

7. Assessment of Etching Resistance

As an independent process from the film touch sensor prepared in the examples and comparative examples, only a protective layer was formed on a soda lime glass having a thickness of 700 μm as a carrier substrate by the same manner as the examples and comparative examples. Subsequently, the glass was immersed in an ITO etchant (MA-SO2, manufactured by Dongwoo Fine-Chem. Co.) at 60° C. for 10 minutes, then a change in a film thickness before and after the immersion was measured and expressed as a percentage, and measured results are shown in Table 2 below.

○: exceeding 98%
Δ: 95% to 98%
x: less than 95%

8. Measurement of Resistance

As an independent process from the film touch sensor prepared in the examples and comparative examples, only an electrode pattern layer was formed on a soda lime glass having a thickness of 700 μm as a carrier substrate by the same manner as the examples and comparative examples. A resistance of the prepared electrode pattern layer was measured by a multimeter. Measured results are shown in Table 2 below.

TABLE 2

| Item | Transmittance (T %) | Elastic modulus (Gpa) | Delami Crack | Thermal stability (T %) | Solvent resistance | ITO resistance | Etching resistance | Resistance (Ω) |
|---|---|---|---|---|---|---|---|---|
| Example 1 | 97 | 4.0 | ○ | 0.3 | ○ | ○ | ○ | 50 |
| Example 2 | 98 | 3.9 | ○ | 0.4 | ○ | ○ | ○ | 50 |
| Example 3 | 99 | 4.2 | ○ | 1 | ○ | ○ | ○ | 50 |
| Example 4 | 98 | 3.8 | ○ | 0.4 | ○ | ○ | ○ | 50 |
| Example 5 | 98 | 3.9 | ○ | 0.6 | ○ | ○ | ○ | 50 |
| Example 6 | 97 | 4.05 | ○ | 0.55 | ○ | ○ | ○ | 50 |
| Example 7 | 98 | 4.5 | ○ | 1.5 | ○ | ○ | ○ | 56 |
| Example 8 | 98 | 4.3 | ○ | 1.2 | ○ | ○ | ○ | 50 |
| Example 9 | 95 | 3.9 | ○ | 0.3 | ○ | ○ | ○ | 50 |
| Comparative Example 1 | 90 | 5.5 | X | 12 | X | X | Δ | 60 |
| Comparative Example 2 | 89 | 5.9 | X | 7 | X | X | X | 60 |

Referring to Table 2 above, it could be seen that the film touch sensors of the examples had excellent crack prevention effects and excellent transmittance, heat resistance, and solvent resistance of the insulation layer, but the film touch sensors of the comparative examples exhibited that one or more effects are deteriorated.

What is claimed is:

1. A film touch sensor comprising:

a separation layer;

a protective layer which is disposed on the separation layer and is a cured layer of a polymer having a repeating unit represented by Formula 1 or 2 below; and an electrode pattern layer disposed on the protective layer:

[Formula 1]

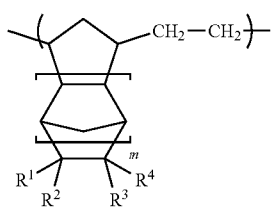

wherein at least one of $R^1$ to $R^4$ is $-X_n-Y_1$, n is 0 or 1, X is an alkylene group or a carbonyl group having 1 to 6 carbon atoms, $Y_1$ is a protonic polar group, the others of $R^1$ to $R^4$ is hydrogen or $-X_n-Y_2$, $Y_2$ is an alkyl group having 1 to 6 carbon atoms, an aryl group having 6 to 12 carbon atoms, or a protonic polar group, wherein the $Y_2$ may be substituted with an alkyl group having 1 to 4 carbon atoms or an aryl group having 6 to 12 carbon atoms, and m is an integer of 0 to 2; and

[Formula 2]

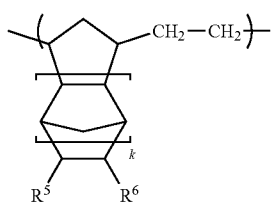

wherein $R^5$ and $R^6$ are connected with each other to form a 3-membered or 5-membered hetero ring which may be substituted with an alkyl group having 1 to 4 carbon atoms or an aryl group having 6 to 12 carbon atoms, and k is an integer of 0 to 2.

2. The film touch sensor according to claim 1, wherein the polymer has a glass transition temperature of 100° C. or higher.

3. The film touch sensor according to claim 1, wherein the protective layer has an elastic modulus of 2.8 to 4.5 GPa.

4. The film touch sensor according to claim 1, wherein the protective layer has a transmittance of 90% or more.

5. The film touch sensor according to claim 1, further comprising a base film attached to an upper side of the electrode pattern layer.

6. An image display device comprising the film touch sensor according to claim 1.

7. A method for fabricating a film touch sensor, the method comprising:
forming a separation layer on a carrier substrate;
applying a protective layer forming composition which contains a polymer having a repeating unit represented by Formula 1 or 2 below on the separation layer and curing the same to form a protective layer thereon;
forming an electrode pattern layer on the protective layer; and
peeling-off the separation layer from the carrier substrate:

[Formula 1]

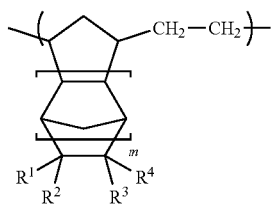

wherein at least one of $R^1$ to $R^4$ is $-X_n-Y_1$, n is 0 or 1, X is an alkylene group or a carbonyl group having 1 to 6 carbon atoms, $Y_1$ is a protonic polar group, the others of $R^1$ to $R^4$ is hydrogen or $-X_n-Y_2$, $Y_2$ is an alkyl group having 1 to 6 carbon atoms, an aryl group having 6 to 12 carbon atoms, or a protonic polar group, wherein the $Y_2$ may be substituted with an alkyl group having 1 to 4 carbon atoms or an aryl group having 6 to 12 carbon atoms, and m is an integer of 0 to 2; and

[Formula 2]

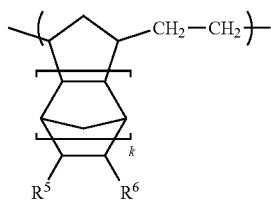

wherein $R^5$ and $R^6$ are connected with each other to form a 3-membered or 5-membered hetero ring which may be substituted with an alkyl group having 1 to 4 carbon atoms or an aryl group having 6 to 12 carbon atoms, and k is an integer of 0 to 2.

8. The method for fabricating a film touch sensor according to claim 7, wherein the curing of the protective layer forming composition is performed including pre-bake and post-bake.

9. The method for fabricating a film touch sensor according to claim 8, wherein the post-bake is performed at 180° C. to 250° C. for 20 minutes to 50 minutes.

* * * * *